(12) United States Patent
Forestiere et al.

(10) Patent No.: US 6,958,307 B2
(45) Date of Patent: Oct. 25, 2005

(54) MATERIALS COMPRISING ORGANIC PHOSPHOROUS-CONTAINING GROUPS BONDED TO A MINERAL OXIDE VIA OXYGEN ATOMS

(75) Inventors: Alain Forestiere, Vernaison (FR); P-Hubert Mutin, Clapiers (FR); André Vioux, Montferrier sur Lez (FR); Gilles Guerrero, Beziers (FR)

(73) Assignee: Institut Francais Du Petrole, Rueil-Malmaison (FR)

( * ) Notice: Subject to any disclaimer, the term of this patent is extended or adjusted under 35 U.S.C. 154(b) by 374 days.

(21) Appl. No.: 09/930,153

(22) Filed: Aug. 16, 2001

(65) Prior Publication Data

US 2002/0023573 A1 Feb. 28, 2002

(30) Foreign Application Priority Data

Aug. 17, 2000 (FR) .......................................... 00 10695

(51) Int. Cl.$^7$ ........................... B01J 31/00; B01J 27/14; B01J 20/22
(52) U.S. Cl. ........................ 502/162; 502/208; 502/401
(58) Field of Search ................................ 502/162, 208, 502/401

(56) References Cited

U.S. PATENT DOCUMENTS

| 4,786,628 A | | 11/1988 | Wieserman et al. ........ 502/401 |
|---|---|---|---|
| 4,788,176 A | * | 11/1988 | Wieserman et al. ........ 502/401 |
| 4,957,890 A | * | 9/1990 | Wieserman et al. ............ 502/4 |
| 4,962,073 A | * | 10/1990 | Martin et al. ................... 502/4 |
| 4,994,429 A | | 2/1991 | Wieserman et al. ........ 502/401 |
| 5,032,237 A | * | 7/1991 | Wieserman et al. ........ 205/188 |
| 5,037,795 A | * | 8/1991 | Wieserman et al. ........ 502/401 |
| 5,059,258 A | | 10/1991 | Wefers et al. ............... 148/272 |
| 5,240,602 A | * | 8/1993 | Hammen .................. 210/198.2 |
| 6,139,752 A | * | 10/2000 | Lindoy et al. .............. 210/681 |
| 2002/0128150 A1 | * | 9/2002 | Foresliere et al. .......... 502/208 |

FOREIGN PATENT DOCUMENTS

| EP | 0 218 506 A1 | 4/1987 |
|---|---|---|
| EP | 0 443 734 A1 | 8/1991 |
| FR | 2 773 171 | 7/1999 |

* cited by examiner

*Primary Examiner*—J. A. Lorengo
*Assistant Examiner*—J. Pasterczyk
(74) *Attorney, Agent, or Firm*—Millen White Zelano & Branigan, P.C.

(57) ABSTRACT

The present invention relates to a composition including an organic phosphorous-containing group bonded via an oxygen atom to a metal oxide of at least one element M. Generally, the composition is essentially amorphous, and includes an essentially monomolecular layer of an organic group directly bonded to the phosphorous atom. In addition, the composition is generally essentially free of any phosphate, phosphonate or phosphinate phase of the element M. Moreover, the composition has a ratio of the element M to phosphorous of about 15:1–200:1.

19 Claims, 1 Drawing Sheet

MATERIALS COMPRISING ORGANIC PHOSPHOROUS-CONTAINING GROUPS BONDED TO A MINERAL OXIDE VIA OXYGEN ATOMS

The present invention relates to materials comprising organic phosphorous-containing groups bonded via a covalent bond to a mineral oxide and usually to a further functional group, usually a terminal group, such as a sulphur-containing functional group, and to their preparation by grafting. It also concerns the various applications of these materials, especially for catalysis, in particular when the organic sulphur-containing group is a terminal sulphonic group or a sulphonic derivative, also as an adsorbent or complexing agent in particular when the organic sulphur-containing group is a terminal thiol group or a derivative of a thiol group such as a sulphide or a polysulphide.

These materials offer an alternative to materials resulting from grafting organosilicon groups to mineral oxides or to cross-linked polysiloxanes, for heterogenisation by grafting organic functions. The use of phosphorous-containing groups and organophosphorous groups have different advantages over the use of organosilicon groups. The ease of formation and stability of P—O-metal bonds is higher than for Si—O-metal bonds, which means that mineral oxide matrices other than silica can be used (for example alumina, zirconium dioxide or titanium dioxide), offering better chemical stability. The absence of POH/POH homocondensation reactions under the usual preparation conditions ensures better homogeneity, i.e., the formation of only P—O-metal bonds to the exclusion of P—O—P bonds.

Materials used in particular as an adsorbent, obtained by reaction between the reactive sites of the oxide/hydroxide particles on a phosphorous-containing compound containing one or more acid organic groups have, for example, been described in U.S. Pat. Nos. 4,788,176 and 4,994,429. Those patents teach that those compounds are obtained by grafting the oxides/hydroxides using acid compounds such as phosphonic acid or phosphinic acid derivatives. Grafting commences at a highly acidic pH, for example 1.8, which causes the formation of an aluminium phosphonate phase in the case where the particles are alumina particles, as the example given below will show, by phosphorous 31 nuclear magnetic resonance spectral analysis and by comparing the specific surface area of the alumina before and after grafting. Further, the use of acidic compounds and a high acidity to carry out grafting can lead to the formation of multilayers or an aluminium phosphonate phase as is mentioned, for example, in Example 1 of U.S. Pat. No. 4,786,628, which is not favourable for applications of such solids, especially in catalysis. The teaching of U.S. Pat. No. 4,786,628 is not clear since FIG. 7 illustrating that invention mentions that a phosphonic acid and/or phosphonic acid solution of at least 0.1 molar must be used, which contradicts the teaching of Example 1, in Example 2 the pH is 1.8 as shown in FIG. 6 and further, in Example 4, the alumina is treated with a 0.3 molar solution of heptadecylphosphonic acid. U.S. Pat. No. 4,994,429 gives an example of an aluminium oxide grafted by a functional group containing sulphur in the form of a sulphonic group, which is introduced by reacting a mineral solid, grafted using phenylphosphonic acid, with fuming sulphuric acid, i.e., containing sulphuric anhydride, i.e., a highly acidic medium with a non negligible risk of alumina attack. Further, none of the patents cited above teach the method of preparing functionalised oxides comprising a sulphur-containing group connected to a phosphorous atom via an aliphatic chain.

A functionalised solid and a method for preparing that solid by grafting has now been discovered that can overcome the disadvantages of the prior art preparation method and can introduce the desired functionality either before or after the grafting step, but preferably before.

Figure 1:
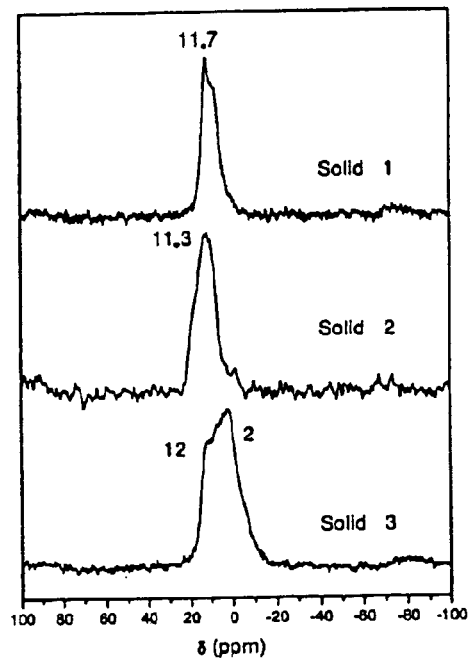
FIG. 1 depicts a phosphorus 31 NMR spectrum of an exemplary solid of the present invention.

In its broadest definition, the functionalised solids of the present invention can be defined as functionalised materials comprising organic phosphorous-containing groups bonded via an oxygen atom to a mineral oxide of at least one element M, said materials being characterized in that they are essentially amorphous, in that they comprise an essentially monomolecular layer of organic groups bonded to said mineral oxide via oxygen atoms of said oxide to the phosphorous atom and in that said materials are essentially free of phosphate, phosphonate or phosphinate phases of said element M. Within the context of the present invention, the term "essentially free of phosphate, phosphonate or phosphinate phase" means that the number of phosphorous atoms present in any phase of the functionalised solid is less than about 10%, usually less than about 3% of the total number of phosphorous atoms present in the solid. The materials of the present invention preferably comprise a sulphur-containing group or a reactive group that can be transformed into a sulphur-containing group, said materials being essentially free of a sulphate phase of said element M. This sulphur-containing group is located at a distance from the phosphorous atom and is bonded to the phosphorous via a hydrocarbon chain. Usually, the phosphorous and the sulphur are each located at one end of the hydrocarbon chain.

In a particular embodiment, the materials of the present invention have a ratio of element M to phosphorous that is about 0.5:1 to about 350:1 and often about 10:1 to about 250:1, usually about 15:1 to about 200:1. The ratio of sulphur to phosphorous is normally about 0.05:1 to about 10:1, often about 0.1:1 to about 5:1 and usually about 0.4:1 to about 2:1.

The material of the present invention is normally a material in which M designates an element from groups IB, IIB, IIIB, IVB, VB, VIB, VIIB, VIII, IIIA, the lanthanides or the actinides of the periodic table (Handbook of Chemistry and Physics, 45$^{th}$ edition, 1964–1965); M often designates an element selected from the group formed by titanium, zirconium, iron and aluminium, preferably selected from elements from the group formed titanium, zirconium and aluminium.

The organic sulphur-containing group is preferably selected from thiol groups and derivatives thereof, and sulphonic acid groups and derivatives thereof. The organic sulphur-containing group is normally selected from the group formed by the thiol group with formula —SH, the sulphide group with formula —S—R1 in which R1 is a hydrocarbon residue, and the polysulphide group with formula —(S)$_y$—R1, in which y is a number equal to 2 or more and R1 is a hydrocarbon residue, or selected from the group formed by the sulphonic acid group with formula —SO$_3$H, organic sulphonate groups with formulae —SO$_3$R1 in which R1 is a hydrocarbon residue, and mineral sulphonate groups with formulae —SO$_3$(M')$_{1/t}$ in which M' is an element with valency t from the periodic table, preferably an alkali metal.

In the above formulae, R1 designates a hydrocarbon group, usually containing 1 to 24 carbon atoms, for example an alkyl, aryl or alkylaryl residue.

The phosphorous-containing groups are normally phosphate, phosphonate or phosphinate type groups as shown below:

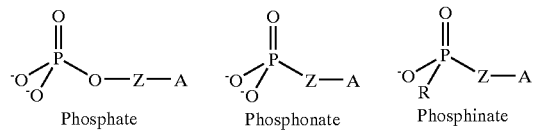

Phosphate     Phosphonate     Phosphinate

EXAMPLES OF PHOSPHOROUS-CONTAINING GROUPS

In these formulae, A represents the organic group, preferably containing sulphur or a reactive group that can be transformed into a sulphur-containing group, and Z is a hydrocarbon group as defined above in combination with the process for preparing the materials in accordance with the present invention.

The invention also concerns a process for preparing a material as defined above, in which a suspension in a liquid of at least one mineral oxide of an element M is brought into contact with at least one solution in a solvent of at least one phosphorous-containing compound with formula I:

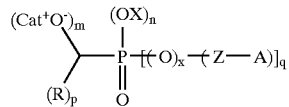

I in which the sum $m+n+p+q$ is equal to 3, $m=0$, 1 or 2, $q=0$, 1 or 2, $x=0$ or 1, $p=0$, 1 or 2, R is a hydrocarbon group, X is a hydrogen atom, a hydrocarbon group or a group with formula $SiR''_3$ in which R" is a hydrocarbon group, Z is a hydrocarbon group optionally containing heteroatoms, $Cat^+$ is a monovalent cation and A is a sulphur-containing group or a reactive group that can be transformed into a sulphur-containing group, said contact being made under conditions of pressure, temperature and acidity of the medium such that practically no phosphate, phosphonate, phosphinate or sulphate phase of said element M is formed. Normally, Z is a hydrocarbon group containing 1 to 24 carbon atoms, preferably 2 to 12 carbon atoms, and usually, Z represents an aromatic hydrocarbon chain or an aliphatic hydrocarbon chain and in this case is preferably a saturated aliphatic hydrocarbon chain bonding the phosphorous-containing group to the sulphur-containing group.

Usually, the phosphorous-containing compound employed is a compound with formula I in which $Cat^+$ is a proton $H^+$ or, preferably, an alkali cation, R is an alkyl group containing 1 to 18 carbon atoms or an aryl group containing 6 to 18 carbon atoms or an alkylaryl group containing 7 to 24 carbon atoms, X is selected from the group formed by alkyl groups containing 1 to 18 carbon atoms, aryl groups containing 6 to 18 carbon atoms, alkylaryl groups containing 7 to 24 carbon atoms and groups with formula $SiR''_3$ in which R" is a hydrocarbon group, Z is a saturated or unsaturated divalent alkyl group containing 1 to 18 carbon atoms or a divalent aryl group containing 6 to 18 carbon atoms or a divalent alkylaryl or arylalkyl group containing 7 to 24 carbon atoms, and A is a sulphur-containing group selected from thiols and derivatives thereof and sulphonic acid groups and derivatives thereof. This group A is preferably a thiol group with formula —SH or a sulphonic group with formula $—SO_3^-Cat'^+$ in which $Cat'^+$ represents a proton $H^+$ or a monovalent cation such as an alkali metal cation. Phosphorous-containing compounds with formula I that can be used advantageously include those in which Z is a saturated divalent alkyl group containing 1 to 6 carbon atoms, preferably a polymethylene group and usually a polymethylene group containing 1 to 4 carbon atoms. Group A can also be a reactive group that can be transformed into a sulphur-containing group, usually a halogenated group, such as a bromine atom or a chlorine atom.

The phosphorous-containing compound with formula I is preferably a compound in which $m=2$, $q=1$ and $n=p=zero$, or a compound with formula I in which $n=2$, $q=1$, $m=p=zero$. When $m=2$, $Cat^+$ is preferably either a proton $H^+$ or an alkaline cation such as sodium or potassium depending on the mineral oxide of element M employed, in particular as a function of its sensitivity to the formation of phosphate, phosphonate or phosphinate phases under the acidity conditions employed in the reaction. When $n=2$, X is preferably an alkyl group containing 1 to 12 carbon atoms, usually 1 to 8 carbon atoms.

The solvent for the phosphorous-containing compound with formula I is, for example, water or an organic solvent such as dimethylsulphoxide, tetrahydrofuran or dichloromethane. The liquid used to suspend the mineral oxide of element M is preferably the solvent used to dissolve the compound with formula I.

The various individual steps employed in preparing the materials of the present invention are conventional steps that are well known to the skilled person; reference will be made thereto in the following examples that illustrate the invention without limiting its scope.

Example 1 (In Accordance with the Invention)

1.049 g ($6.64 \times 10^{-3}$ moles) of phenylphosphonic acid was dissolved in a methanol/water mixture (750/250 ml) in a three-necked flask. The pH of the solution, measured using a standardised pH meter, was 3.2. The pH was then adjusted to 6 by adding a 1N aqueous sodium hydroxide solution. A suspension of 2 g ($1.96 \times 10^{-2}$ moles) of Degussa C alumina in 200 ml of deionised water was then added. A cooling system was added to the apparatus and the reaction mixture was stirred for 24 hours at ambient temperature. The solid was then filtered and washed 5 times with 50 ml of methanol to remove the physisorbed phenylphosphonic acid. The solid was washed with deionised water, ethanol, acetone and ether and dried for 5 hours at 120° C. under $5 \times 10^{-2}$ mbar.

Elemental analysis of solid 1 obtained produced the following results: Al 37.0%; P 2.1%, giving an Al/P mole ratio of 20.2.

The phosphorous 31 NMR spectrum of solid 1 (see FIG. 1), made using a Bruker Avance 300 MHz machine, showed a broad peak at 11.7 ppm with a shoulder at 10.5 ppm, corresponding to the chemical displacement expected for phenylphosphate groups bonded to the surface of alumina particles. The specific surface area of the alumina used as a support remained unchanged at 90 m²/g.

Example 2 (In Accordance with the Invention)

1.42 g ($6.64 \times 10^{-3}$ moles) of diethylphenylphosphonate was dissolved in 40 ml of dry dichloromethane in a three-necked flask. A suspension of 2 g ($1.96 \times 10^{-2}$ moles) of Degussa C alumina (dried overnight at 120° C. under 5×10⁻² mbars) in 40 ml of dry dichloromethane was then added. A cooling system was added to the apparatus, which was placed under argon. The reaction mixture was stirred for 24 hours at 40° C. The solid was then filtered and washed 5 times with 50 ml of methanol to remove the physisorbed diethylphenylphosphonate. The solid was then washed with dry dichloromethane, acetone and ether and dried for 5 hours at 120° C. under 5×10⁻² mbar.

Elemental analysis of solid 2 obtained produced the following results: Al 50.5%; P 1.0%, giving an Al/P mole ratio of 58.

The phosphorous 31 NMR spectrum of solid 2 (see FIG. 1), made using a Bruker Avance 300 MHz machine, showed a broad peak at 11.3 ppm, corresponding to the chemical displacement expected for phenylphosphate groups bonded to the surface of alumina particles. The specific surface area of the alumina used as a support remained unchanged at 90 m²/g.

Example 3 (Comparative)

This example used the operating protocol described in Example 1 of U.S. Pat. No. 4,788,176. 1.58 g (1×10⁻² moles) of phenylphosphonic acid was dissolved in 100 ml of deionised water (concentration 0.1 M) in a three-necked flask. This solution was added to 10 g (9.8×10⁻² moles) of Degussa C alumina (specific surface area 90 m²/g) (dried overnight at 120° C. under 5×10⁻² mbars). A very dense paste was obtained; this reaction mixture was stirred for 24 hours at ambient temperature. The solid was then filtered and washed with water then with methanol to remove the physisorbed phenylphosphonic acid, then dried for 5 hours at 110° C. under 5×10⁻² mbar.

Elemental analysis of solid 3 obtained produced the following results: Al 28.8%; P 2.3%, giving an Al/P mole ratio of 14.4.

The phosphorous 31 NMR spectrum of solid 3 (see FIG. 1) made using a Bruker Avance 300 MHz machine, showed a broad peak at +2 ppm, corresponding to the chemical displacement expected for phenylphosphonate groups bonded to aluminium atoms in an aluminium phenylphosphonate phase, and a shoulder at 12 ppm, corresponding to the chemical displacement expected for phenylphosphonate groups bonded to the surface of alumina particles.

Further, grafting under the conditions described above resulted in a substantial increase in the specific surface area of the alumina used as a support, which changed from 90 m²/g before grafting to 140 m²/g after grafting.

Example 4 (In Accordance with the Invention)

In this example, a functionalised solid containing a sulphonic acid group was prepared.

In a first step, a phosphonate with formula $Br(CH_2)_3PO_3Et_2$ (I') was prepared using the Arbuzov reaction (J. March, "Advanced Organic Chemistry", 3$^{rd}$ Edition, John Wiley & Sons, New York, 1985, p. 848).

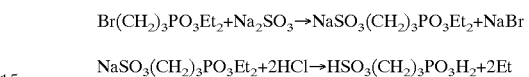

1 equivalent of triethylphosphite and 1.5 equivalents of 1,3-dibromopropane were introduced into a reactor in a nitrogen atmosphere. The reactor was heated to 140° C., and maintained at this temperature with stirring for 24 hours. After distilling at a pressure of 0.1 millibars (mbar) (10 Pascals) at an average column bottom temperature of 90° C., diethyl bromopropylphosphonate with formula $Br(CH_2)_3PO_3Et_2$ (I') was obtained in a yield of 60 mole % with respect to the triethylphosphite introduced. This phosphonate was then functionalised using the procedure described below employing a conventional reaction for replacing a halogen atom by a sulphonate group as described by J. March in "Advanced Organic Chemistry", 3$^{rd}$ Edition, John Wiley & Sons, New York, 1985, p. 363, to obtain the phosphonate with formula $NaSO_3(CH_2)_3PO_3Et_2$ (II). The last step of this preparation was hydrolysis of the P—OEt bonds to a P—OH bond to obtain the phosphonic acid with formula $HSO_3(CH_2)_3PO_3H_2$ (II').

$Br(CH_2)_3PO_3Et_2+Na_2SO_3 \rightarrow NaSO_3(CH_2)_3PO_3Et_2+NaBr$ $NaSO_3(CH_2)_3PO_3Et_2+2HCl \rightarrow HSO_3(CH_2)_3PO_3H_2+2Et$ 1.35 g (6.64×10⁻³ moles) of propane-1-phosphono-3-sulphonic acid with formula $HSO_3(CH_2)_3PO_3H_2$ (II')was dissolved in a methanol/water mixture (750/250 ml) in a three-necked flask. The pH of the solution, measured using a standardised pH meter, was 3.1. The pH was then adjusted to 6 by adding an aqueous 1N sodium hydroxide solution. A suspension of 2 g (1.96×10⁻² moles) of Degussa C alumina (dried overnight at 120° C. at 5×10⁻² mbars) in 200 ml of deionised water was then added. A cooling system was added to the apparatus and the reaction mixture was stirred for 24 hours at ambient temperature. The solid was then filtered and washed 5 times with 50 ml of methanol to remove the physisorbed propane-1-phosphono-3-sulphonic acid. The solid was then washed with deionised water, ethanol, acetone and ether and dried for 5 hours at 120° C. under 5×10⁻² mbar. Elemental analysis of solid 4 obtained produced the following results: Al 36.6%; P 0.9% and sulphur S: 0.7%, giving an Al/P mole ratio of 47 and a S/P mole ratio of 0.76.

Figure 2:
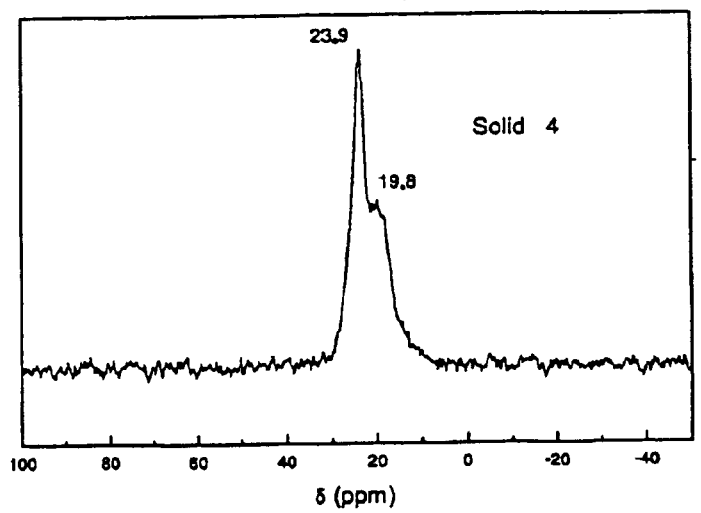
FIG. 2 depicts a phosphorus 31 NMR spectrum of another exemplary solid of the present invention.

The phosphorous 31 NMR spectrum of solid 4 (see FIG. 2), made using a Bruker Avance 300 MHz machine, showed a broad peak at 23.9 ppm with a shoulder at 19.8 ppm, corresponding to the chemical displacement expected for $O_3P(CH_2)_3SO_3H$ groups bonded to the surface of the alumina particles.

Example 5 (Comparative)

This example employed the operating procedure described in Example 2 of U.S. Pat. No. 4,994,429. 4 g (39.2 mmoles) of Degussa C alumina (dried overnight at 120° C. at 5×10⁻² mbar) was placed in a three-necked flask provided with a cooling system. 16 ml of a 0.1 M solution of phenylphosphonic acid in water was added. The mixture was heated under reflux with stirring for one hour at 83° C. It was allowed to cool to ambient temperature and decant. The product was vacuum dried at 110° C. in an oven overnight. Once dry, the product was placed in a 100 ml flask and 8 ml of fuming sulphuric acid was added. The flask was closed and it was shaken to coat all of the particles, then stirred for two minutes. The contents of the flask were then placed in an Erlenmeyer flask with 1.2 liters (66.7 moles) of deionised water and left to stand. The product was then diluted again 3 times using 1.2 liters of water (66.7 moles) each time. After allowing the product to decant, the water was evacuated and the product was recovered from methanol. It was allowed to stand overnight and then the methanol was evacuated. Again, the product was recovered from methanol and allowed to evaporate off. The product was vacuum dried at 60° C. overnight.

Elemental analysis of solid 5 produced the following results: Al: 35.5%; P: <0.2%; S: 0.24%. Thus, there had been a very large loss of phosphonate groups, giving an Al/P mole ratio of 203.8 and a S/P mole ratio of 1.16.

Example 6 (In Accordance with the Invention)

0.68 g ($3.32\times10^{-3}$ moles) of propane-1-phosphono-3-sulphonic acid with formula $HSO_3(CH_2)_3PO_3H_2$ (II') prepared as described above in Example 4 was dissolved in a methanol/water mixture (750/250 ml) in a three-necked flask. The pH of the solution, measured using a standardised pH meter, was 3.1. The pH was then adjusted to 3.5 by adding an aqueous 1N sodium hydroxide solution. A suspension of 2 g ($2.5\times10^{-2}$ moles) of Degussa P25 $TiO_2$ (dried overnight at 120° C. at $5\times10^{-2}$ mbars) in 200 ml of deionised water was then added. A cooling system was added to the apparatus and the reaction mixture was stirred for 72 hours at ambient temperature. The solid was then filtered and washed 5 times with 50 ml of methanol to remove the physisorbed propane-1-phosphono-3-sulphonic acid. The solid was then washed with deionised water, ethanol, acetone and ether and dried for 5 hours at 120° C. under $5\times10^{-2}$ mbar.

Elemental analysis of solid 6 obtained produced the following results: Ti: 55.5%; P: 0.4%; S: 0.5%, giving a Ti/P mole ratio of 90 and a S/P mole ratio of 0.8.

Figure 3:
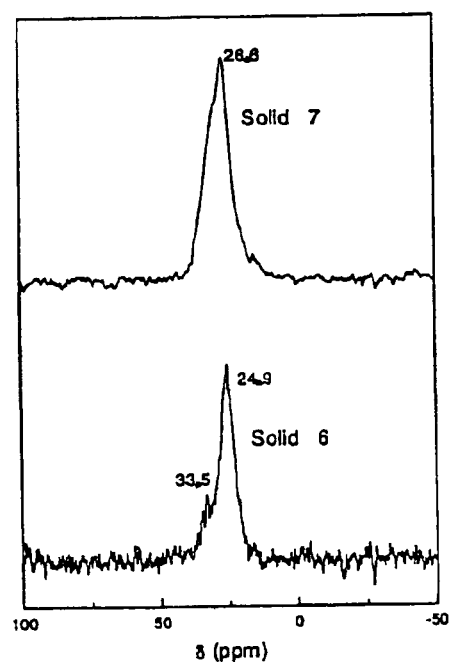
FIG. 3 depicts a phosphorus 31 NMR spectrum of a still further exemplary solid of the present invention.

The phosphorous 31 NMR spectrum of solid 6 (see FIG. 3) made using a Bruker Avance 300 MHz machine, showed a broad peak at 24.9 ppm with a shoulder at 33.5 ppm, corresponding to the chemical displacement expected for $O_3P(CH_2)_3SO_3H$ groups grafted to the surface of titanium oxide particles.

Example 7

In this example, a functionalised solid containing a thiol group was prepared.

In a first step, the procedure described above in Example 4 was followed to prepare diethyl bromopropylphosphonate with formula $Br(CH_2)_3PO_3Et_2$ (I'). In a second step, the procedure described in German patent DE-1 024 964, for example, was carried out in a reactor containing 2 equivalents of sodium hydrosulphide in solution in methanol: a dilute solution in methanol containing 1 equivalent of diethyl bromopropylphosphonate with formula $Br(CH_2)_3PO_3Et_2$ (I') was introduced dropwise, it was heated under reflux and the reflux was maintained for 4 hours, with stirring. After evaporating off the methanol, it was taken up in pentane and filtered to recover sodium bromide NaBr. After evaporating off the pentane and vacuum distillation, the diethylmercaptopropylphosphonate with formula $HS(CH_2)_3PO_3Et_2$ was recovered. 0.70 g ($3.32\times10^{-3}$ moles) of diethylmercaptopropylphosphonate was dissolved in 40 ml of dry dichloromethane in a three-necked flask. A suspension of 2 g ($2.5\times10^{-2}$ moles) of Degussa P25 $TiO_2$ (dried overnight at 120° C. at $5\times10^{-2}$ mbars) in 40 ml of dry dichloromethane was then added. A cooling system was added to the apparatus and the system was placed under argon. The reaction mixture was stirred for 24 hours at 40° C. The solid was then filtered and washed 5 times with 50 ml of methanol to remove the physisorbed diethylmercaptopropylphosphonate. The solid was then washed with dry dichloromethane, acetone and ether and dried for 5 hours at 120° C. under $5\times10^{-2}$ mbar.

Elemental analysis of solid 7 obtained produced the following results: Ti: 57.2%; P: 0.54%; S: 0.4%, giving a Ti/P mole ratio of 74 and a S/P mole ratio of 0.8. The phosphorous 31 NMR spectrum of solid 7 (see FIG. 3), made using a Bruker Avance 300 MHz machine, showed a broad peak at 26.6 ppm, corresponding to the chemical displacement expected for $O_3P(CH_2)_3SH$ groups bonded to the surface of titanium oxide particles.

What is claimed is:

1. A composition comprising an organic phosphorous-containing group bonded via an oxygen atom to a metal oxide of at least one element M, the composition being essentially amorphous, comprising an essentially monomolecular layer of an organic group wherein a phosphorous atom of the organic group is directly bonded to an oxygen atom of the metal oxide forming a P—O—M bond, the composition being essentially free of any phosphate, phosphonate or phosphinate phase of the element M, and the ratio of the element M to phosphorus being 15:1–200:1.

2. A composition according to claim 1 comprising, distanced from the phosphorous atom by at least one hydrocarbon group, a sulphur-containing group or a reactive group that can be transformed into a sulphur-containing group, the composition being essentially free of a sulphate phase of the element M.

3. A composition according to claim 2, comprising an organic sulphur-containing group selected from the group consisting of thiols and derivatives thereof, and sulphonic acid groups and derivatives thereof.

4. A composition according to claim 3, wherein the organic sulphur-containing group is selected from the group consisting of a thiol group with formula —SH, a sulphide group with formula —S—R1 wherein R1 is a hydrocarbon residue, and a polysulphide group with formula —(S)_y—R1, wherein y is a number equal to 2 or more and R1 is a hydrocarbon residue.

5. A composition according to claim 3, wherein the organic sulphur-containing group is selected from the group consisting of a sulphonic acid group with formula —$SO_3H$, organic sulphonate groups with formulae —$SO_3R1$ wherein R1 is a hydrocarbon residue, and a metal sulphonate group with formulae —$SO_3(M')_{1/t}$ wherein M' is an element with valency t from the periodic table.

6. A composition according to claim 5, wherein the organic sulphur-containing group is the metal sulphonate group of the formulae —$SO_3(M')_{1/t}$ wherein M' is an alkali metal.

7. A composition according to claim 2, further comprising a hydrocarbon chain of 1–24 carbon atoms connecting the phosphorous-containing group to the sulphur-containing group.

8. A composition according to claim 7, wherein the hydrocarbon chain connecting the phosphorous-containing group to the sulphur-containing group is an aromatic chain, an aliphatic chain, or a saturated aliphatic chain.

9. A composition according to claim 1, wherein M is an element selected from groups 3–14, the lanthanides and the actinides of the periodic table.

10. A process for preparing a functionalized material according to claim 1, comprising contacting a suspension of at least one metal oxide of an element M in a liquid with at least one solution in a solvent of at least one phosphorous-containing compound with formula I:

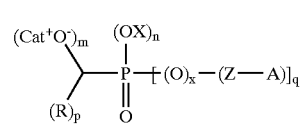

wherein the sum m+n+p+q is equal to 3, m=0, 1 or 2, q=0, 1 or 2, x=0 or 1, p=0, 1 or 2, R is a hydrocarbon group, X is a hydrogen atom, a hydrocarbon group or a group with formula $SiR''_3$ wherein $R''$ is a hydrocarbon group, Z is a hydrocarbon group optionally containing heteroatoms, $Cat^+$ is a monovalent cation and A is a sulphur-containing group or a reactive group that can be transformed into a sulphur-containing group, the contact being made under conditions of pressure, temperature and acidity of the medium such that practically no phosphate, phosphonate, phosphinate or sulphate phase of the element M is formed.

11. A process according to claim 10, wherein a suspension in a liquid of at least one metal oxide of element M is brought into contact with a solution in a solvent of a phosphorous-containing compound with formula I wherein $Cat^+$ is a proton $H^+$, R is an alkyl group containing 1 to 18 carbon atoms or an aryl group containing 6 to 18 carbon atoms or an alkylaryl group containing 7 to 24 carbon atoms, X is selected from the group consisting of alkyl groups containing 1 to 18 carbon atoms, aryl groups containing 6 to 18 carbon atoms, alkylaryl groups containing 7 to 24 carbon atoms and groups with formula $SiR''_3$ wherein $R''$ is a hydrocarbon group, Z is a saturated or unsaturated divalent alkylene group containing 1 to 18 carbon atoms or a divalent arylene group containing 6 to 18 carbon atoms or a divalent alkylarylene or arylalkylene group containing 7 to 24 carbon atoms, and A is a sulphur-containing group selected from the group consisting of thiols and derivatives thereof and sulphonic acid groups and derivatives thereof.

12. A process according to claim 10, wherein the phosphorous-containing compound with formula I is a compound wherein Z is a saturated divalent alkylene group containing 1 to 6 carbon atoms.

13. A process according to claim 10, wherein the solvent for the phosphorous-containing compound is selected from the group consisting of tetrahydrofuran, dimethylsulphoxide, dichloromethane and water.

14. A process according to claim 10, wherein the phosphorous-containing compound with formula I is a compound wherein m=2, q=1 and n=p=zero.

15. A process according to claim 10, wherein the phosphorous-containing compound with formula I employed is a compound wherein n=2, q=1 and m=p=zero.

16. A composition according to claim 1, wherein M is selected from the group consisting of titanium, zirconium, iron, aluminium, silicon and tin.

17. A composition according to claim 16, wherein M is titanium, zirconium or aluminium.

18. A composition according to claim 1, wherein the number of phosphorus atoms present in any phase of the composition is less than 10% of the total number of phosphorus atoms present in the composition.

19. A composition according to claim 1, wherein the number of phosphorus atoms present in any phase of the composition is less than about 10% of the total number of phosphorus atoms present in the composition.

* * * * *